(12) United States Patent
Freier et al.

(10) Patent No.: US 6,301,418 B1
(45) Date of Patent: Oct. 9, 2001

(54) OPTICAL WAVEGUIDE WITH DIFFUSE LIGHT EXTRACTION

(75) Inventors: David George Freier; Joseph John Bianconi, both of St. Paul, MN (US); Richard Decena Ornelaz, Jr., Stanford, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 108 days.

(21) Appl. No.: 08/957,554

(22) Filed: Oct. 24, 1997

(51) Int. Cl.⁷ .................. G02B 6/16; F21V 8/00
(52) U.S. Cl. .......... 385/123; 362/558; 362/559; 385/31; 385/901
(58) Field of Search .................. 385/15, 31, 32, 385/39, 48, 123, 125, 147, 901; 362/32, 551, 552, 558, 559, 582

(56) References Cited

U.S. PATENT DOCUMENTS

| 3,497,981 | 3/1970 | Tyne ........................ 385/32 |
| 3,805,459 | * 4/1974 | Baksay ................... 51/319 |
| 4,422,719 | 12/1983 | Orcutt .................. 350/96.3 |
| 5,027,259 | 6/1991 | Chujko .................. 362/32 |
| 5,432,876 | * 7/1995 | Appeldorn et al. ............ 385/31 |
| 5,536,265 | * 7/1996 | Van Den Bergh et al. ....... 606/2 |
| 5,537,297 | 7/1996 | Ghandehari ............ 362/32 |
| 5,542,017 | 7/1996 | Koike .................... 385/123 |
| 5,754,717 | * 5/1998 | Esch ..................... 385/31 |
| 5,799,124 | 8/1998 | Zorn et al. ............... 385/125 |

FOREIGN PATENT DOCUMENTS

| 44 07 498 A1 | 9/1995 | (DE) ........................ 385/123 |
| 2 689 649 | 10/1993 | (FR) ........................ G02B/6/10 |
| 58-007603 | 1/1983 | (JP) ........................ 385/31 |
| 1-187505 | 7/1989 | (JP) ........................ 385/123 |
| 7-198947 | 8/1995 | (JP) ........................ 385/123 |
| 7-198951 | * 8/1995 | (JP) ........................ 385/123 |
| 7-198953 | 8/1995 | (JP) ........................ 385/123 |
| 8-15527 | * 1/1996 | (JP) ........................ 385/123 |
| 8-146226 | 6/1996 | (JP) ........................ 385/31 |
| WO 84/00800 | 3/1984 | (WO) ........................ F21V/7/04 |
| WO 95/16877 | 6/1995 | (WO) ........................ 385/32 |
| WO 97/08571 | 3/1997 | (WO) ........................ 362/32 |
| WO 97/38263 | 10/1997 | (WO) ........................ 362/32 |

OTHER PUBLICATIONS

Abstract of Japanese Patent Application No. J01105206–A, dated Apr. 21, 1989.
Abstract of German Patent Application No. DE 4326521 A, dated Feb. 17, 1994.
Abstract of Japanese Patent Application No. JP 7–198948, dated Aug. 1, 1995.
Abstract of Japanese Patent Application No. JP 8–313708, dated Nov. 29, 1996.
Abstract of Japanese Patent Application No. JP 8–313891, dated Nov. 29, 1996.
Abstract of Japanese Patent Application No. JP 8–329716, dated Dec. 13, 1996.

* cited by examiner

Primary Examiner—John D. Lee
(74) Attorney, Agent, or Firm—Bruce E. Black

(57) ABSTRACT

An optical waveguide has a core and a cladding. The inner surface of the cladding is roughened in a non-uniform manner to provide for extraction of diffuse light. The core is made from a light transmitting material and formed with an axis in the general direction of light flow through the optical waveguide. The cladding surrounds the core and has an index of refraction that is less than the index of refraction of the core. The cladding has an inner surface which is roughened with indentations to extract light from the core. The indentations are substantially non-parallel with respect to the axis of the core. The inner surface of the cladding may be roughened by a variety of methods including sandblasting, the formation of grooves using a rotating brush, and the vibration of particles provided within the cladding.

23 Claims, 8 Drawing Sheets

OPTICAL WAVEGUIDE WITH DIFFUSE LIGHT EXTRACTION

FIELD OF THE INVENTION

The present invention is directed generally to an optical waveguide and, more particularly, a fiber-type optical waveguide which is structurally adapted for extraction of diffuse light.

BACKGROUND OF THE INVENTION

Although optical waveguides, such as optical fibers, have been designed for delivering light over long distances with little attenuation in the intensity of the light, there are many applications in which it is desirable that light also be extracted from the waveguide at various points along its length. There are two types of extraction: directed and diffuse.

Directed extraction methods provide extracted light in a particular desired direction. A variety of structures for directed light extraction, many of which use prisms, have been developed. These extractors are particularly useful for applications requiring, for example, light to be directed toward a particular point or object.

Diffuse light extraction methods provide light that is directed over a range of directions. There are a variety of applications that require diffuse rather than directed light. Such applications range from lighted display signs to lamps for offices or other workplaces. Neon lighting has been used for these applications. However, optical waveguides with diffuse light extractors have several advantages over neon lighting. For example, the optical waveguide typically uses a low voltage light source as opposed to the neon light which requires high voltage for operation. Importantly, optical waveguides can use a variety of light sources including incandescent and electrical arc sources, that may be more energy efficient than neon. Furthermore, the optical waveguide can provide light of any desired color by using an appropriately colored light source or light filter. The color can be easily changed by changing the light source or filter. Neon lighting, on the other hand, requires either a particular choice of gas or phosphor coatings in the tubing of the neon lighting or, alternatively, the use of colored translucent glass tubing. Finally, neon lighting is made of glass which is rigid and cannot be subsequently adapted to alterations in the desired lighting design. Optical waveguides, on the other hand, can be made from flexible and durable materials which can be altered to form a variety of different configurations depending on the need.

While there are many advantages to using optical waveguides and diffusional light extractors, progress in this field has been slow. Existing products show that the industry has long struggled, with little success, to provide a practical design that is also efficient.

SUMMARY OF THE INVENTION

The instant invention is directed to optical waveguides, and methods for their manufacture, which are structurally adapted to provide efficient extraction of diffuse light. One embodiment is an optical waveguide which has a core and a cladding. The core is made from a light transmitting material and has an axis in the general direction of light flow through the optical waveguide. The cladding surrounds the core and has an index of refraction that is less than the index of refraction of the core. The cladding has an inner surface which is roughened along a length of the cladding with indentations to extract light from the core. The inner surface is roughened in a non-uniform manner to produce a predetermined light extraction pattern from the waveguide. In addition, the indentations on the inner surface of the cladding are substantially non-parallel with respect to the axis of the core.

Another embodiment of the invention includes a method of making an optical waveguide with diffuse light extraction. A cladding is formed as a hollow tube along an axis and provided with a first end and an inner surface. At least a portion of the inner surface of the cladding is roughened by forming indentations on the inner surface. The indentations are substantially non-parallel with respect to the axis of the cladding and the inner surface is roughened in a non-uniform manner to produce a predetermined light extraction pattern. A core material is disposed within the cladding to form the optical waveguide.

The above summary of the present invention is not intended to describe each embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
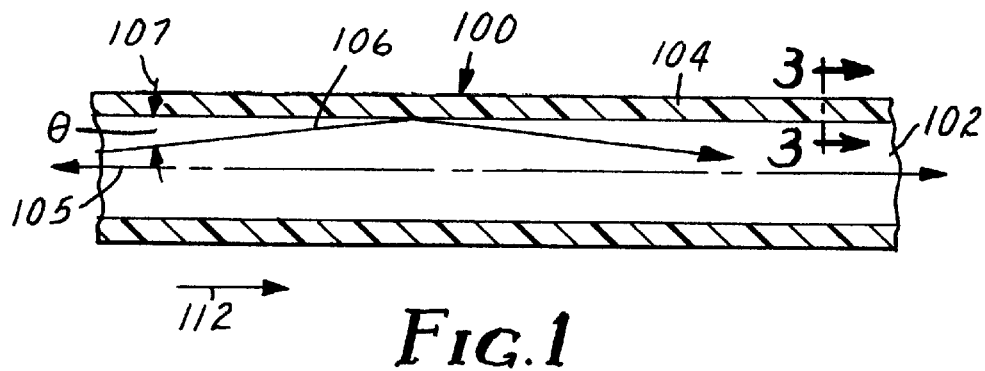
FIG. 1 illustrates a longitudinal cross-section of one embodiment of an optical waveguide, according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENT

The present invention is applicable to a variety of applications in which it is desired to extract light from a light guiding system, such as an optical waveguide. The present invention has been found particularly useful for extracting diffuse light from a light guiding system. Light guiding systems are assumed to include, for example, small core and large core diameter systems, as well as other devices employing internal reflection for guiding light from one point to another in the system. While the present invention is not so limited, an understanding of various aspects of the invention is best gained through a discussion of various application examples operating in such an environment.

Figure 2:
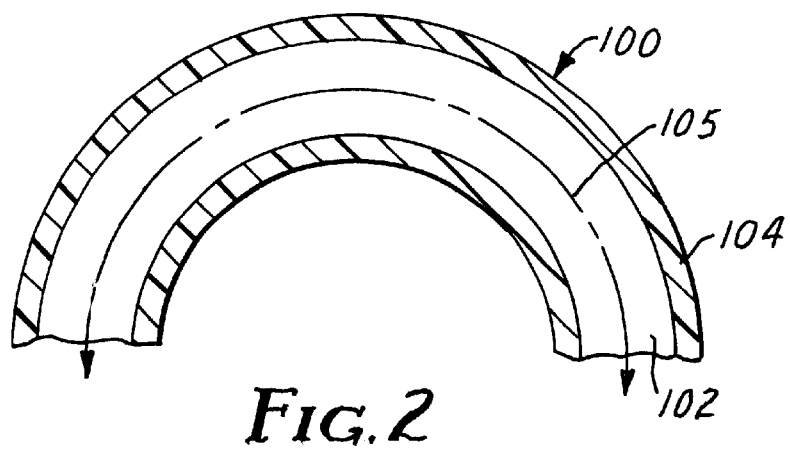
FIG. 2 illustrates a longitudinal cross-section of another embodiment of an optical waveguide, according to the invention.

FIG. 1 illustrates one embodiment of a light guiding system which is configured for diffuse light extraction. The particular light guiding system depicted in FIG. 1 is an optical waveguide 100 which includes a core 102 and a cladding 104 around core 102. An axis 105 of core 102 is defined as running the length of core 102. Typically, axis 105 also defines the general direction 112 of light flow through the optical waveguide 100. An axis 105 may also be described even if the optical waveguide 100 is bent, as depicted in FIG. 2.

Cladding 104 typically has an index of refraction which is smaller than the index of refraction of core 102. Such an arrangement typically results in substantial internal reflection of light 106 traveling through the core. The internal reflection of light occurs when light traveling down the core is reflected back towards the center of the core as the light encounters the inner surface of the cladding. In order for light to be totally reflected at an interface between two materials, the light must be traveling in the material with the higher index of refraction and the angle 107, θ, between the light ray and the surface of the lower refractive index material must be less than the critical angle, $\theta_c$, as defined in the following equation:

$$\cos(\theta_C) = \frac{n_2}{n_1}$$

where $n_1$ is the index of refraction of the material through which the light is traveling (e.g., core 102) and $n_2$ is the index of refraction of the material which the light encounters (e.g., cladding 104).

Many optical waveguides are constructed to provide, as near as possible, total internal reflection. Typically, in most optical waveguides, light injected in one end of the waveguide which has an angle, θ, with the core/cladding interface greater than the critical angle, $\theta_c$, will travel through the cladding and be absorbed in the cladding or leave the waveguide after only a short distance. The light remaining in the waveguide is primarily light which encounters the cladding surface at an angle less than the critical angle and therefore reflects off the inner surface of the cladding with little loss in intensity.

In the instant invention, optical waveguide 100 typically provides for substantial internal reflection of the light. However, the waveguide is modified so that diffuse light is extracted along at least a portion of waveguide 100. To accomplish the extraction of diffuse light, the inner surface of cladding 104 is roughened to provide a randomly displaced core/cladding interface, shown as indentations 108 in FIG. 3. Light incident on the roughened interface at an angle less than the critical angle is no longer entirely reflected into the core. A portion of the light is transmitted into the cladding at various angles about the incident direction. The transmitted light that encounters the cladding/air interface at a sufficiently steep angle, either directly (110) or subsequent to a scattering event within the cladding (113) exits the cladding. The light leaving through the cladding is diffuse because it is not directed in any preferred direction.

The amount of light that is scattered depends on the statistics and structure of the randomly displaced core/cladding interface. The depth of indentations and degree of roughening may be manipulated, as described below, to control the amount of light which diffuses from the light guiding system.

The degree of roughening of the inner surface of cladding 104 can be described by an average surface roughness, $R_a$. This parameter, $R_a$, can be measured by a variety of techniques. One example of such a technique includes illuminating the surface with light and comparing the ratio of reflected light to scattered light to calculate the average surface roughness using well-known relationships. One particular device for use in determining the average surface roughness is the WYKO RST Roughness/Step Tester (WYKO Corp., Tucson, Ariz.) which utilizes a 633 nm light source. The operation of this device is described in more detail in the Examples. The measurements of average surface roughness provided herein are determined using this device, as described in the Examples. Other devices and techniques may produce different results.

Figure 4A:
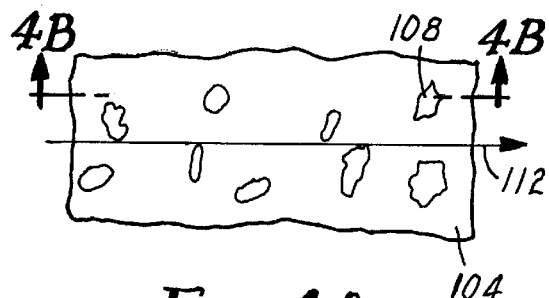
FIGS. 4A and 4B illustrate a top and side view, respectively, of one embodiment of the interface of FIG. 3 which includes indentations formed on the inner surface of the cladding.
Figure 4B:
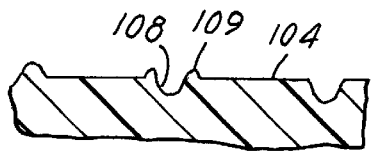

Indentations 108 in cladding 104 typically provide a significant cross-sectional area perpendicular to the general direction of light flow 112 to generate significant light scattering. The indentations may be formed in many different shapes. For example, the indentations 108 may be pits or craters with hemispherical, ovoid, or irregular shapes, as illustrated in FIGS. 4A and 4B. In addition, the indentations may also include portions 109 which are raised above the original surface of cladding 104.

Figure 5A:
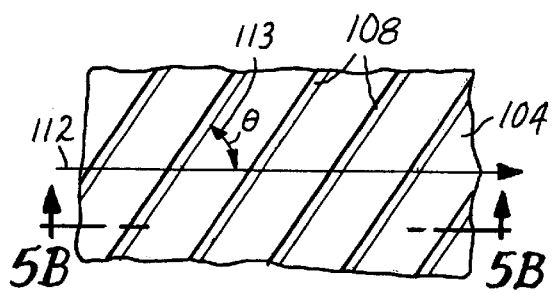
FIGS. 5A and 5B illustrate a top and side view, respectively, of another embodiment of the interface of FIG. 3 which includes grooves formed on the inner surface of the cladding.
Figure 5B:
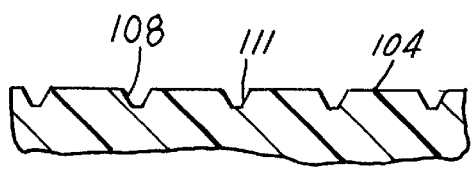

Alternatively, the indentations may be grooves 111 in the inner surface of the cladding, as illustrated in FIGS. 5A and 5B. However, these grooves are typically oriented so that they are substantially non-parallel to the general direction of light flow 112. Grooves which are parallel or substantially parallel to the direction of light flow 112, do not typically scatter light efficiently. By making the grooves substantially non-parallel to the direction of light flow 112, the effective length of the grooves in the direction of light flow approaches the same dimension as the width of the grooves. This configuration closely resembles the pits and craters described in the previous embodiment and provides a substantial cross-sectional area perpendicular to the direction of light flow 112 which is larger than that of parallel or nearly parallel grooves at the same groove density, thereby increasing the scattering of light.

Figure 3:
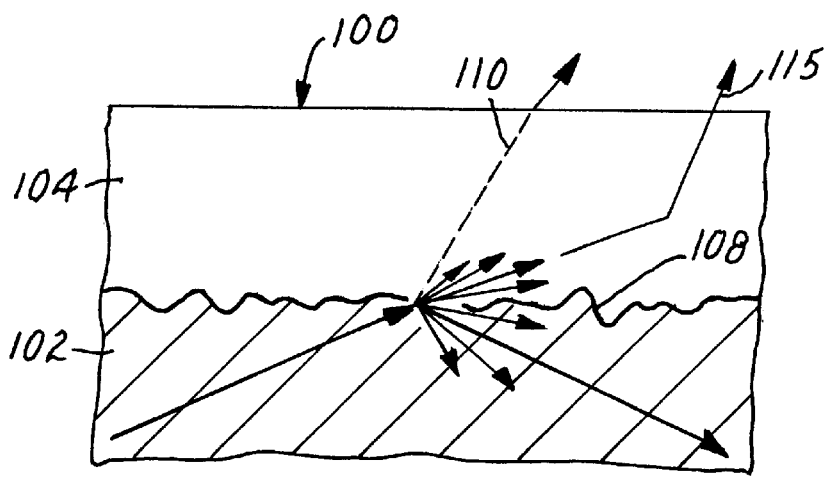
FIG. 3 illustrates an expanded cross-section of the interface between the core and cladding of the optical waveguide of FIG. 1.

The grooves typically make at least a 30° angle, $\phi$, 113 with respect to the axis of general light flow 112 as depicted in FIG. 3. Preferably, the angle is at least 45°, more preferably, the angle is at least 60°, and most preferably, the angle is at least 75°.

Figure 6:
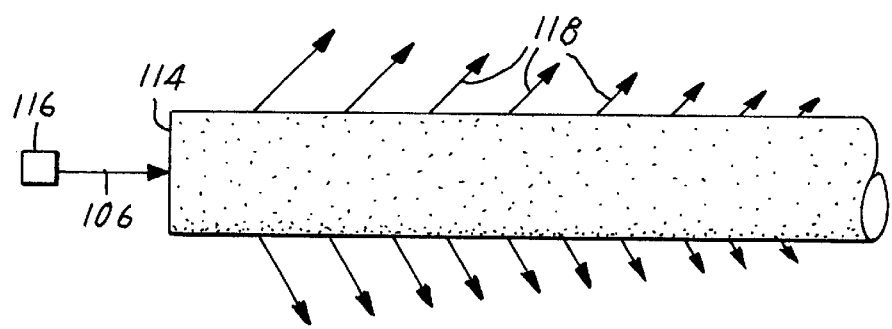
FIG. 6 illustrates a side view of a previously known optical waveguide with uniform roughening.

One problem with extracting light 106 injected into optical waveguide 100 by a light source 116 is that as light diffuses through the cladding, there is less light traveling in the waveguide for extraction at points further down the waveguide. Thus, as illustrated in FIG. 6, if the surface roughening is uniform, there is a consequent decrease in the intensity (depicted by the length of arrows 118) of diffuse illumination at points further away from a light receiving end 114 of an optical waveguide 100 due to the reduction of light traveling through the waveguide.

One previously used method to reduce this loss in light intensity over the length of the optical waveguide includes limiting the roughening of the surface to an amount that will extract only a small portion of the light (e.g., 10% or less) over the length of the roughened portion of the waveguide. This, however, is not an efficient use of light as most of the light is not extracted and exits from an end of the waveguide opposite the light receiving end.

Figure 7:
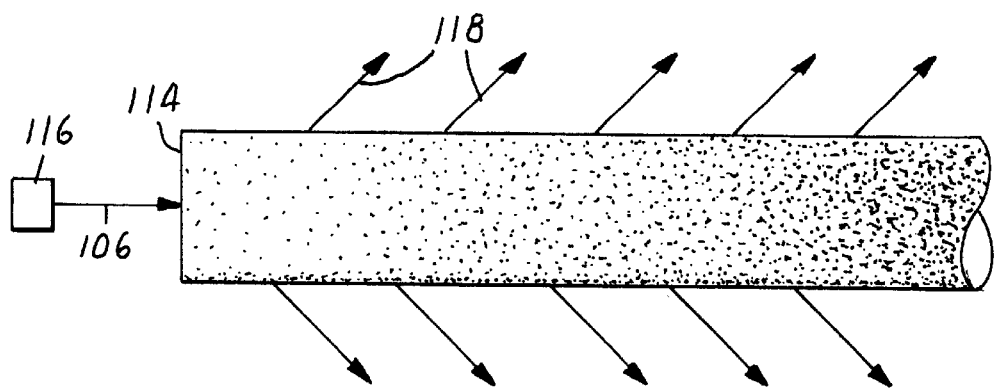
FIG. 7 illustrates a side view of one embodiment of an optical waveguide, according to the present invention, with a non-uniform roughness.

The instant invention uses a different approach to control the intensity of light extracted from optical waveguide 100. To offset the loss of light through cladding 104, the roughness of the inner surface of cladding 104 is increased with increasing distance from a light source 116, as measured along core 102. By appropriate adjustment of the roughening of cladding 104, a uniformly luminous diffuse optical waveguide 100 can be prepared, as illustrated in FIG. 7. The relative amount of roughness of the inner surface is referred to as "the degree of roughening".

The degree of roughening of the inner surface of cladding 104 may be adjusted in a continuous manner, e.g., a continuous increase in the roughening of the surface along the length of optical waveguide 100. Alternatively, the increases in roughness may be made at discrete intervals, e.g., an increase in roughness every few centimeters. Preferably, the drop in intensity over each of the discrete intervals, due to the equivalent roughness of the surface throughout the interval, is insignificant under normal use. This may be controlled by appropriate choice of the length of the intervals and the amount that the roughness increases at each interval.

In other embodiments of the invention, the depth or length of indentations 108, instead of the density of indentations 108, in the direction of light flow are varied to alter the amount of light that is extracted. Typically, a deeper or wider indentation extracts more light. Alterations of the roughness parameters can be useful in controlling the amount of light that will be extracted. Just as with the density of the indentations, these parameters may be continuously altered along the length of the waveguide or altered at discrete intervals.

Figure 8:
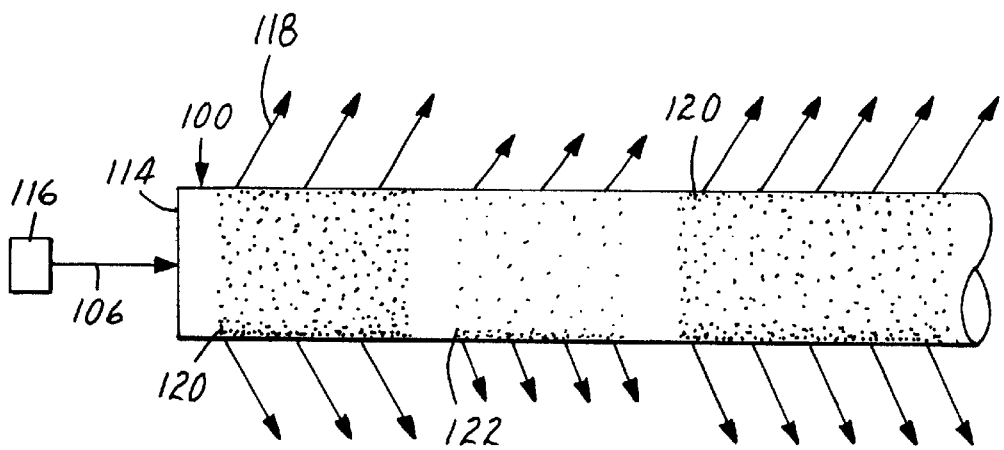
FIG. 8 illustrates a side view of another embodiment of an optical waveguide, according to the present invention, with high and low extracted light regions.
Figure 9:
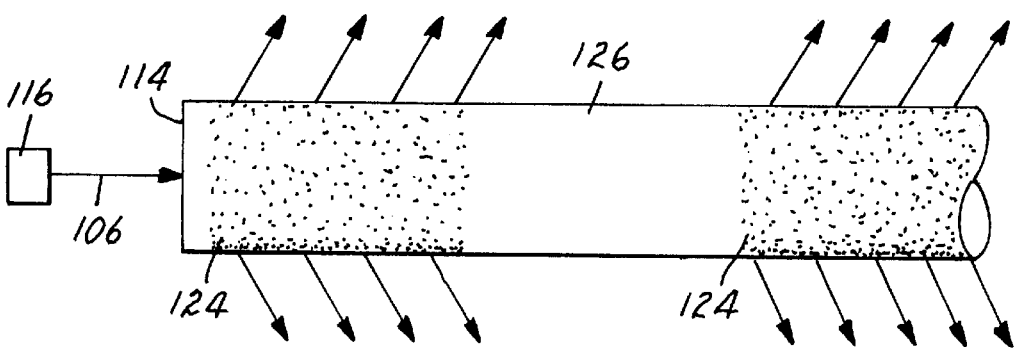
FIG. 9 illustrates a side view of a further embodiment of an optical waveguide, according to the present invention, with regions having no light extraction between light extraction regions.

By adjusting the amount of surface roughness (i.e., altering the degree of roughness), a waveguide with varying degrees of luminosity along its length can be constructed. Thus, an optical waveguide with regions of high 120 and low 122 diffusive light output can be made, as shown in FIG. 8. In addition, an optical waveguide may be constructed with regions 124 having diffuse light extraction and other regions 126 in which little or no light is extracted as shown in FIG. 9.

Figure 10:
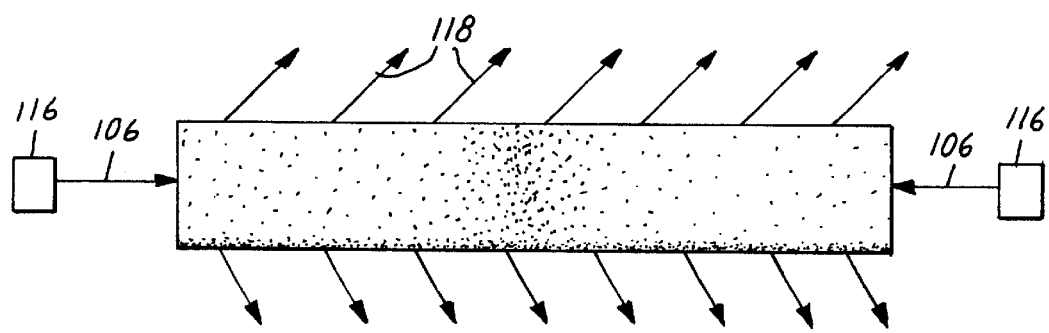
FIG. 10 illustrates a side view of one embodiment of an optical waveguide, according to the present invention, for use with two light sources.
Figure 11:
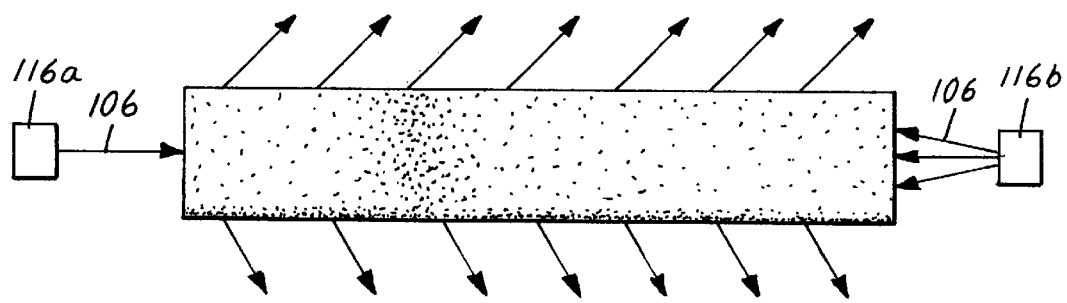
FIG. 11 illustrates a side view of another embodiment of an optical waveguide, according to the present invention, for use with two light sources.

In some embodiments, optical waveguide 100 may be designed for use with two or more light sources. As with the optical waveguides described above, a variety of roughening configurations can be used. For example, for uniform light extraction from an optical waveguide illuminated by two light sources 116 of approximately equal intensity, the roughening will typically increase with increasing distance from a nearest of light sources 116, the roughening being the greatest in the approximate center of the optical waveguide as depicted in FIG. 10. If light sources 116a, 116b are not equal in intensity, then the greatest roughening will typically occur closer to the less intense light source 116a, as shown in FIG. 11. Other configurations of non-uniform roughness, as described above, can be used to create regions of high, low, or no diffusive light output, as needed for a desired light emission pattern.

A wide variety of light sources for the optical waveguides can be used. Both monochromatic light sources, such as lasers or sources which are filtered to allow only a specific wavelength of light, and polychromatic light sources, such as incandescent or electrical arc sources can be used. The diffuse light emitted from the waveguide can be colored by, for example, using a colored light source or using a housing around the cladding that preferentially allows the desired color to pass through the housing. In addition, the waveguide may be used to emit light having different colors at different regions of the waveguide by using, for example, an appropriately colored housing in each region. If two or more light sources are used, the two or more light sources may be the same or different colors.

A variety of materials can be used to form the optical waveguides of the invention. Core 102 is typically formed from a polymeric material, including, for example methacrylates, such as n-butyl methacrylate and 2-ethylhexyl methacrylate. Optical waveguides of the invention may, for example, be prepared by copolymerizing at least one methacrylate monomer derived from the esterification of methacrylic acid with an alcohol having at least 4 carbon atoms and an ethylenically-unsaturated, free-radical polymerizable crosslinking agent.

Particularly useful methacrylate monomers derived from the esterification of methacrylic acid with an alcohol having at least 4 carbon atoms include, for example, n-butyl methacrylate, n-hexyl methacrylate, 2-ethylhexyl methacrylate, n-octyl methacrylate, iso-octyl methacrylate, n-decyl methacrylate, and dodecyl methacrylate, and combinations thereof. Preferred methacrylate monomers include N-butyl methacrylate, n-hexyl methacrylate, 2-ethylhexyl methacrylate, n-octyl methacrylate, and combinations thereof.

Crosslinking agents useful in optical waveguides are those ethylenically-unsaturated, free-radical polymerizable compounds possessing two or more free-radical polymerizable, ethylenically-unsaturated reactive moieties, such as, for example, acrylate, methacrylate, allyl, or styryl groups, or the like. Preferred crosslinking agents are dimethacrylates and diallyl compounds, most preferably dimethacrylate compounds. Useful dimethacrylate compounds include, for example, hexanediol dimethacrylate, ethylene glycol dimethacrylate, diethylene glycol dimethacrylate, triethylene glycol dimethacrylate, tetraethylene glycol dimethacrylate, propylene glycol dimethacrylate, trimethylol propane dimethacrylate, and methacrylate-terminated oligomers such as polyethylene glycol dimethacrylate and polypropylene oxide dimethacrylate, and combinations thereof. Preferred dimethacrylate crosslinking agents include diethylene glycol dimethacrylate, triethylene glycol dimethacrylate, tetraethylene glycol dimethacrylate, propylene glycol dimethacrylate, and various combinations thereof.

In particular, one suitable core material includes a 1:1 mixture by weight of n-butyl methacrylate and 2-ethylhexyl methacrylate, which, in turn, can contain 0.05% by weight triethylene glycol dimethacrylate crosslinking agent and 0.2% by weight di(4-t-butylcyclohexyl)peroxydicarbonate (Perkadox 16™, Akzo Nobel Chemicals, Inc., Chicago, Ill.) thermal initiator. Additional materials and examples are presented in U.S. Pat. No. 5,225,166, incorporated herein by reference.

Core diameters may range from about 7 mm to about 18 mm outer diameter. Typically available core diameters are 7, 9, 12, and 18 mm, however, larger or smaller diameter cores may also be used.

In some embodiments, core 102 is made from a flowable material which can, over time, flow around the inner surface of cladding 104 to form an outer surface of core 102 which is complementary to the inner surface of cladding 104. Such core materials include, for example, the methacrylate core materials described above.

If the core does not flow or flows slowly, a fluid having the same or nearly the same index of refraction (typically less than a 2% difference) can be included between the core and the cladding to help ensure proper optical contact between core 102 and cladding 104. This fluid may also be used even if the core flows around the cladding. Suitable fluids include, for example, a siloxane copolymer (PS 785, Petrarch Silanes, United Chemical Technologies, Inc., Bristol, Pa.), having an index of refraction (1.465 at 583 nm) nearly identical to the core. Other suitable index matching substances are known in the art.

The cladding can be formed from a variety of different compounds. As an example, fluoropolymer tubing has been found to be useful as a cladding for the optical waveguide. Examples of suitable fluoropolymer tubing include Teflon-100™ fluorinated ethylene polymer tubing (FEP tubing, DuPont Chemicals Co. Fluoropolymer Division, Wilmington, Del.), Teflon™ poly(tetrafluoroethylene) (PTFE) tubing (DuPont), THV tubing (a terpolymer of tetrafluoroethylene, hexafluoropropylene, and vinylidene fluoride, available from Dyneon, Inc., St. Paul, Minn.) or other similar commercially-available highly fluorinated polymeric tubing (e.g., tubing from Zeus Industrial Products, Inc., Raritan, N.J.). Preferably, the tubing is a heat-shrinkable tubing.

In many embodiments, core 102 is disposed within cladding 104 after the inner surface of the cladding is formed. Core 102 may be disposed in cladding 104 by a variety of methods, including, for example, sliding a solid core into the cladding or pouring a liquid core into the cladding and optionally solidifying the core. If cladding 104 is heat shrinkable, it may be more tightly formed around core 102 by application of heat.

Figure 18:
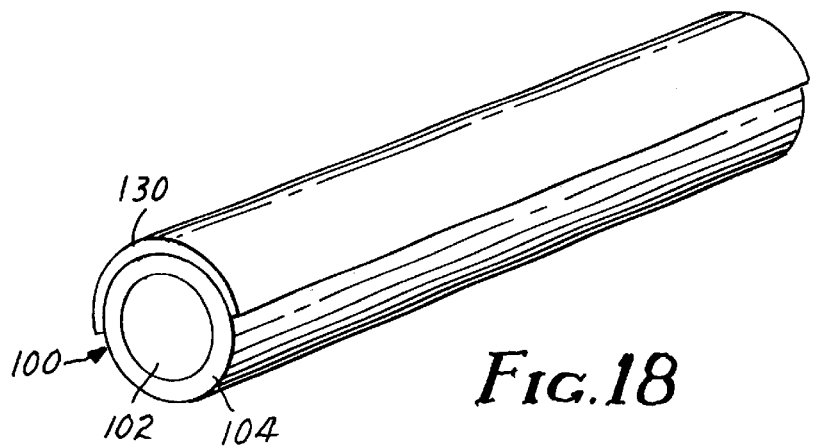
FIG. 18 is a perspective representation of an optical waveguide having a reflecting member positioned over a portion of the optical waveguide, according to the present invention.

An optional light reflecting member 130 may be provided around a portion of optical waveguide 100, as illustrated in FIG. 18, to reflect light extracted from waveguide 100 in a desired direction. For example, if the waveguide is used in a lamp, it may be desirable to have the light directed downwardly. The reflecting member 130 may be positioned on waveguide 100 so that light which would otherwise be directed in an upward direction is reflected downward. Light reflecting member 130 may be disposed directly on waveguide 100 or may be spaced apart from waveguide 100. Preferably, the light reflecting member diffusively reflects light.

Diffuse reflective materials can include, for example, poly(tetrafluoroethylene) diffuse reflective film as described in U.S. Pat. No. 5,596,450; inorganic-pigment filled polyolefin light reflective sheets as described in European Patent Application No. 721,181; Tyvek™ nonwoven polyethylene fabric (DuPont Co., Wilmington, Del.); Melinex™ titania-filled microvoided poly(ethylene terephthalate) (ICI Plastics, Wilmington, Del.); Scotchcal™ opaque films (3M Company, St. Paul, Minn.); opaque, white films such as Gerber catalog numbers 220-20 and 230-20 (Gerber Scientific, Inc., South Windsor, Conn.); Poreflon™-brand polytetrafluoroethylene sheet material (Sumitomo Electric Industries, Osaka, Japan); and microporous films that can be filled with, e.g., white inorganic pigment. Preferably, the diffuse reflective film is a polyolefin film prepared by the TIPS (thermally-induced phase separation) method described in, e.g., U.S. Pat. Nos. 4,247,498 and 4,867,881 (liquid-liquid phase separation), U.S. Pat. No. 4,539,256 (solid-liquid phase separation) and U.S. Pat. No. 4,726,989 (solid-liquid phase separation using nucleating agents), each of which is incorporated herein by reference. Preferably, the polyolefin TIPS film comprises polypropylene.

In some embodiments, cladding 104 is encased in a protective outer jacket (not shown). Typically, the outer jacket is more abrasion- and handling-resistant than the cladding and can be easily removed from the cladding. The outer jacket can be, for example, polyethylene, or other low-cost polymers.

Although fluoropolymer tubing, described above, is available in several inner- and outer-diameters, one useful size of fluoropolymer tubing has an inner diameter of 12 mm (approximately ½ inch) and a wall thickness of 0.8 mm (1/32 inch), and, in some embodiments, is encased in polyethylene tubing having an inner diameter of 13.6 mm (17/32 inch) and a thickness of 2.4 mm (3/32 inch). For purposes of the following description, tubing of these dimensions will be assumed. Other examples of useful fluoropolymer tubing include: tubing with an inner diameter of 7 mm, a wall thickness of 0.6 mm, an outer jacket inner diameter of 8.2 mm, and outer jacket thickness of 2.3 mm; tubing with an inner diameter of 9 mm, a wall thickness of 0.7 mm, an outer jacket inner diameter of 10.4 mm, and outer jacket thickness of 2.7 mm; and tubing with an inner diameter of 18 mm, a wall thickness of 0.7 mm, an outer jacket inner diameter of 19.4 mm, and outer jacket thickness of 3.1 mm. When manufactured in production quantities, the FEP tubing from DuPont, described above, can have an interior rms roughness of approximately 8 nm, with most of the displacement power occurring on length scales of 30 $\mu$m or greater.

Figure 12:
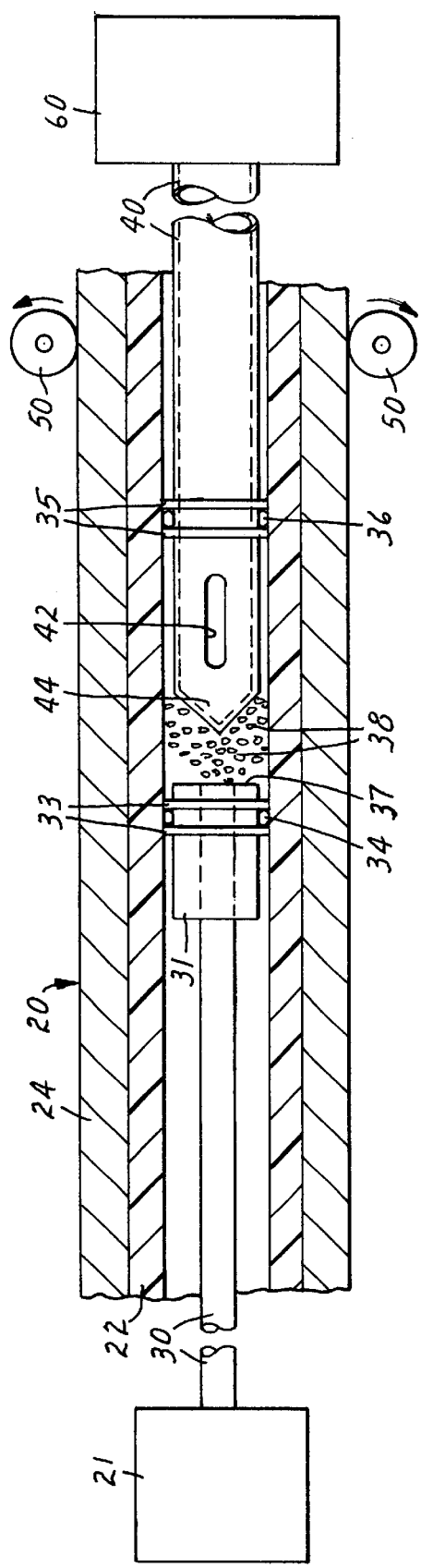
FIG. 12 illustrates a partial cross-sectional view of an apparatus for roughening the inner surface of the cladding of an optical waveguide using sandblasting, according to the present invention.

In one preferred embodiment of the invention, the interior of a cladding is roughened by controlled abrasive blasting, commonly referred to as sandblasting. Referring to FIG. 12, the components of one example of a suitable sandblasting apparatus 20 include an abrasive delivery unit 21, capable of delivering a controlled flux of abrasive particles on demand at a specified air pressure, and a vacuum dust collector 60, to collect excess abrasive. The abrasive delivery unit 21 can be, for example, an air-driven PowerFlo 2000™ model sandblaster (Comco Inc., Burbank, Calif.).

Particulate delivery unit 21 illustrated in FIG. 12 propels abrasive particles 38 down a delivery tube 30 and through an exiting nozzle 31 at an orifice 37. Abrasive particles 38 typically impinge directly on the inner surface of a cladding 22. A deflector head 44 may be provided to further direct abrasive particles 38 towards the inner surface of cladding 22. Spent particles 38 can be collected in vacuum collector 60. In the embodiment illustrated in FIG. 12, vacuum collector 60 is coupled to deflector head 44 through a collection tube 40 to allow debris to flow through at least one orifice 42 in deflector head 44. Other configurations of collection tube 40 and vacuum dust collector 60 are also possible.

In one embodiment, both delivery tube 30 and collection tube 40 are fixed in place while cladding 22, optionally encased in an outer jacket 24, is moved using puller wheels 50. In other embodiments, the delivery tube and collection tube may be moved while the cladding remains stationary.

The rate at which cladding 22 (or the delivery and collections tubes) is moved may, at least in part, determine the amount of abrasion of the inner surface of cladding 22. For the device illustrated in FIG. 12 and described in the Examples, the movement of the cladding can range from approximately 45.7 cm/min (1.5 ft/min) to 366 cm/min (12 ft/min). Higher and lower rates are also possible.

Exiting nozzle 31 can be constructed of, for example, stainless steel or other abrasion-resistant material. Vacuum head 44 may also be similarly constructed. A particularly useful nozzle 31 for use with the preferred cladding described above has an outside diameter of 11.2 cm (0.44 inch), and typically can be placed approximately 5 to 15 mm, preferably 5–10 mm, and more preferably 5 to 6 mm (approximately ¼ inch) from vacuum head 44. The nose of vacuum head 44 forms an impingement zone that can be of any useful shape, such as, for example, a 90° cone (i.e., the angle between the straight side of collection tube 40 and vacuum head 44 is 135°).

Both exiting nozzle 31 and vacuum head 44 may be held in sealed contact with the inner surface of cladding 22 by sealing members 34 and 36. Suitable sealing members 34, 36 include, for example, O-rings or spacers whose outer diameters are slightly larger than the inner diameter of cladding 22. Suitable materials for the O-rings or spacers include, for example, Teflon-impregnated butyl rubber (available from R.E. Pervis, Bloomington, Minn., Part No. 2-012 N818-70). Alternatively, other sealing members may be used, provided that they are lubricated with a common household lubricant, such as 3-in-1™ oil (Boyle-Midway, Inc., New York, N.Y.). Sealing members 34 and 36 can be held in place by, e.g., washers 33 and 35, preferably placed on both sides of sealing members 34 and 36, so that, as cladding 22 and/or outer jacket 24 is moved by the puller wheels 50, sealing members 34 and 36 are held in place. Typically, washers 33 and 35 are rigid or stiff and preferably made of polymeric materials.

Abrasive particles 38 are preferably spherical rather than irregular in shape so that they can impact the cladding surface and cause a crater with a minimum chance of being imbedded in the surface. Examples of suitable particles include spherical beads of glass, polymer, inorganic minerals or salts, or metals, and can include BT-13™ glass beads (50–100 μm diameter), Microblaster™ Precision Abrasive Powder "G" (50 μm diameter sodium bicarbonate particles), and aluminum oxide, silicon carbide, and plastic beads, all available from Comco Inc. (Burbank, Calif.). Bead size can range from about 25μm to 250 μm, preferably 50 to 150 μm, and more preferably 50 to 100 μm in diameter, for reasons of easier handling and resultant crater size.

When the inner surface of cladding 22 has been abraded to the desired extent, it can be used to prepare polymer light fibers, as described in the Examples below. Typically, before introducing a core in cladding 22, the interior of the cladding is cleaned, for example, by rinsing with water and/or detergent followed by water, or may be cleared of residual grit using high-pressure air.

Figure 13B:
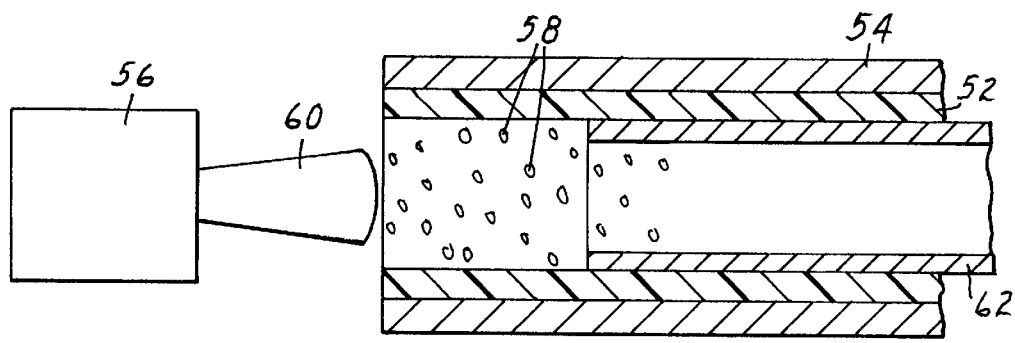
FIGS. 13A and 13B illustrate a partial cross-sectional view of another apparatus for roughening the inner surface of the cladding of an optical waveguide using sandblasting, according to the present invention.
Figure 13A:
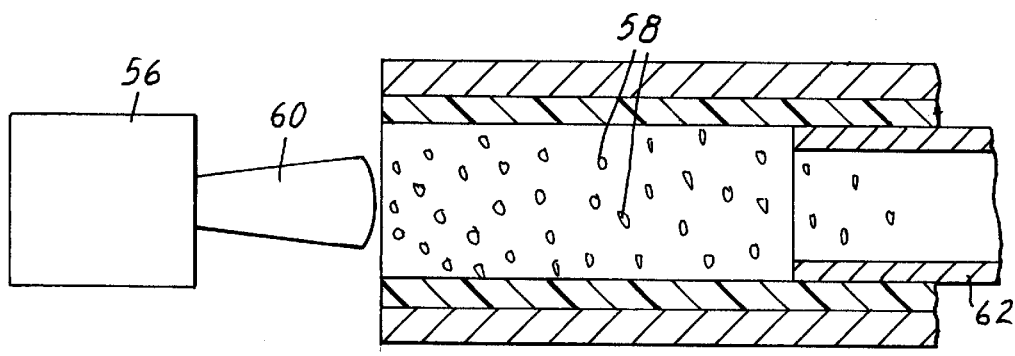

Another method of roughening the interior surface of a cladding 52, optionally enclosed in an outer jacket 54, also involves sand blasting. An abrasive delivery unit 56 ejects abrasive particles 58 from a nozzle 60 which is positioned near an opening in cladding 52, as illustrated in FIGS. 13a and 13b. A protective member 62 is provided within cladding 52. Protecting member 62 is typically formed in the shape of cladding member 52. In one embodiment, abrasive particles 58 are directed at the inner surface of cladding 52 at a relatively low pressure with protecting member 62 being removed from cladding 52 or slightly inserted into cladding 52. After a predetermined period of time, protecting member 62 is slid into cladding 52 or moved further into cladding 52 and the pressure at which abrasive particles 58 are directed at the inner surface of cladding 52 is increased. This process is repeated several times with protecting member 62 being positioned further into cladding 52 and the pressure at which abrasive particles 58 are ejected is increased at each step, as illustrated in FIGS. 13a and 13b. Typically, the increases in pressure are such that craters formed by the abrasive particles at each increased pressure step are substantially deeper and/or wider than craters formed during previous steps. This results in an inner surface of the cladding 52 which is roughened in a non-uniform manner.

Alternatively, the steps may be performed in the opposite order in which the pressure is reduced in a stepwise manner and protecting member 62 is slid further away from the end of cladding 52 through which the abrasive particles 58 are directed. This particular configuration also provides a non-uniform roughened surface.

The degree of roughness imparted to the inside surface of cladding 52 can be varied by varying the air pressure in delivery unit 56 and/or by changing the nature of abrasive particles 58. By way of illustration, cladding 52 can be roughened using spherical glass beads of approximately 100 to 150 μm diameter which are blasted into a sample of cladding 52 at varying pressures, including, for example, 138, 172.5 and 207 kPa (20, 25, and 30 psi) air pressure for 30 seconds each. At 138 kPa (20 psi), the surface shows randomly-positioned, nearly circular craters, typically 30 μm in diameter and 0.2 μm deep at their centers. In addition, irregularly-shaped ridges measuring about 10 μm wide and from 10 to 100 μm long appear downstream from many of the craters. One sample of cladding abraded at 138 kPa exhibited a density of 3 craters for a sample measuring 312×234 μm in area. At 172.5 kPa (25 psi), the craters appeared to be larger (50 μm in diameter and 0.3 μm deep) and more dense: (a density of approximately 15 craters per 312×234 μm section was observed). At 207 kPa (30 psi), the craters were 0.5 to 1.0 μm deep with a density approximately twice that of the 172.5 kPa sample, such that the 50 μm diameter craters nearly cover the surface of the sample.

Figure 14:
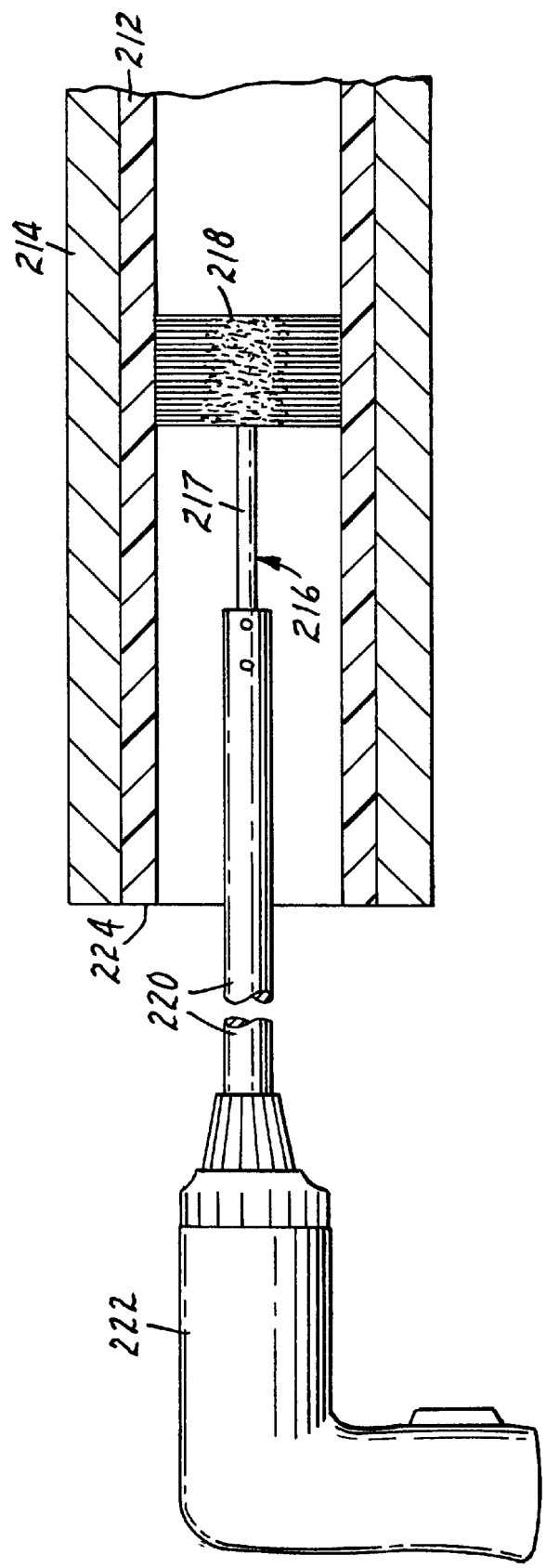
FIG. 14 illustrates a partial cross-sectional view of an apparatus for roughening the inner surface of the cladding of an optical waveguide using a brush, according to the present invention.

Referring to FIG. 14, another method of forming the optical waveguides of the invention includes abrading the inner surface of a cladding 212 with a brush 216 having a handle 217 and bristles 218 fixedly mounted to a rod 220, which, in turn, is clamped to a rotation device 222 such as, for example, a drill. Rotation device 222 is started and the rotating brush 216 is inserted into cladding 212 and optional jacket 214.

Using this method, a series of spiraling grooves is provided on the inner surface of cladding 212. The rate of rotation (rpm) may be held constant or may be varied to vary the density of grooves. The rate of rotation of brush 216 may be, for example, 1000–1500 rpm and preferably 1000–1200 rpm.

Rotating brush 216 is inserted into cladding 212 at a constant or varying rate of speed. Typical rates are 1.27 cm/sec to 12.7 cm/sec, preferably 1.27–7.62 cm/sec, more preferably 1.27–5.08 cm/sec, and most preferably 2.54 cm/sec. Brush 216 may be retracted at the same rate of speed. Varying the rate of speed may alter the density of grooves and therefore alter the surface roughness and consequent light extraction capability of the resultant optical waveguide.

The rate of rotation of brush 216 as provided by rotation device 222 and the rate of speed at which brush 216 is inserted into cladding 212 should be chosen so that the grooves formed in cladding 212, as illustrated in FIGS. 5a and 5b, form an angle, $\phi$, which is typically at least about 30°, preferably at least about 45°, more preferably at least about 60°, and most preferably at least about 75°, with respect to the general direction of light flow 112 (see FIG. 5a). The rates of rotation and rate of insertion described above are provided as examples. Appropriate rates of rotation and rates of insertion will often depend upon the rotation device 222 actually used.

One method of varying the amount of abrasion includes increasing the rate of rotation of brush 216 at points distant from the tube end and decreasing the rate of rotation near cladding end 224. Another method includes decreasing the rate of insertion of brush 216 at distant points and increasing the insertion rate near cladding end 224. Other methods of varying the surface roughness can also be used.

Brush 216 may be a laboratory bottle brush, a wire plumber's brush, or any common brush having bristles mounted on a handle capable of being adapted for rapid rotation. For example, laboratory bottle brushes are available from Fisher Scientific (Pittsburgh, Pa.). Brushes useful in the invention can have bristles made of nylon, polyethylene, polypropylene, and the like, or can be made with natural materials, such as hog bristles. Soft, flexible bristles produce less abrasion and hard, stiff bristles produce more abrasion, per revolution or per insertion-withdrawal sequence. If severe abrasion is desired, a brush having metal or wire bristles can be used, such as, e.g., plumbing brushes available from W.W. Grainger Inc. (Lincolnshire, Ill.). Preferably, nylon bristles of moderate hardness are used, in order to be able to control the degree of abrasion. If very stiff, hard bristles, such as wire bristles, are used, a single pass in and out of the tube may cause too much roughness, such that most of the light is extracted quite close to the light source.

The length of brush 216 likewise can determine the amount of abrasion inside cladding 212. A long brush head typically has more bristles than a short brush head, so that more bristles are in contact with the inside of the tube for a longer time. Laboratory bottle brushes typically have a brush head length of from 1.27–12.7 cm, preferably 2.54–7.62 cm, and more preferably 5.08–7.62 cm.

Once the cladding has been roughened to the desired extent, it is cleaned, for example, by flushing with water to remove any debris that may have been generated. It can then be used to prepare polymeric optical waveguides.

Additional methods of forming grooves or roughening the interior surface of the cladding as contemplated in the invention include, but are not limited to, sandpaper in a cylindrical form, e.g., mounted onto a dowel or other rod, and of a size to be inserted into a tube; a grinding stone (or wheel or cylinder, etc.) such as is commercially available from Dremel Power Tools (Racine, Wis.); or a threading tap such as can be used to turn threads on the inside of, for example, a nut or other metal piece to accept a threaded screw or bolt.

Figure 15:
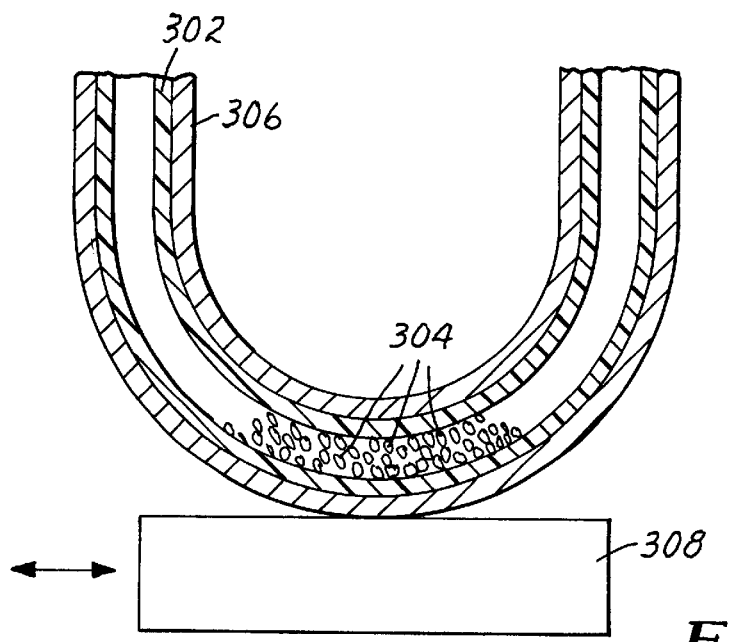
FIG. 15 illustrates a partial cross-sectional view of an apparatus for roughening the inner surface of the cladding of an optical waveguide by vibrating abrasive particles within the cladding, according to the present invention.

An additional method of roughening the inner surface of a cladding 302 includes abrasion by controlled vibration of abrasive particles 304 inside cladding 302 as illustrated in FIG. 15. In this method, an amount of abrasive particles 304 is placed inside a length of cladding 302, the cladding being optionally covered with an outer jacket 306. The abrasive particles are agitated by an external vibrating device 308, such as a commercial orbital sander or a commercial handheld jigsaw, for an amount of time and over a desired portion of cladding 302, such that the inner surface of cladding 302 is sufficiently roughened.

Abrasive particles 304 useful in the method can be of any appropriate material and of any useful size. Suitable abrasive particles include, for example, mineral particles such as silicon carbide (SiC), alumina (e.g., $Al_2O_3$), titania ($TiO_2$), Cubitron™ ceramic aluminum oxide mineral (3M Company, St. Paul, Minn.), cubic boron nitride, zirconia ($ZrO_2$), and silicon nitride (e.g., "SiN"); inorganic materials such as sodium bicarbonate, glass beads and irregular glass particles; polymeric materials, preferably crystalline and high-melting polymers such as poly(methyl methacrylate), polycarbonates, polyamides such as Nylon™, polyethylene, and polypropylene; magnetic particles, such as elemental iron, iron alloys, magnetic iron oxides; and other known hard particulate materials. The particular choice of abrasive particles 304 can influence the degree of abrasion obtained depending, for example, upon the hardness and surface roughness ("jaggedness") of the abrasive particles 304 and the relative hardness of cladding 302. Particles 304 that are only slightly harder (or less flexible, or less deformable, or have a higher modulus) than cladding 302 or are slightly jagged will abrade the cladding less than those that are considerably harder or more jagged.

Abrasive particles 304 can have an average diameter, for example, of from about 0.05 mm to about 1.0 mm (270 mesh to 18 mesh), preferably from about 0.12 mm to about 0.5 mm (120 mesh to 35 mesh) and more preferably from about 0.12 mm to about 0.25 mm (120 mesh to 60 mesh). Careful choice of particle size can determine the degree of abrasion obtained and the size of "craters" formed in the cladding interior due to the amount of kinetic energy that can be supplied to larger vs. smaller particles.

The amount of abrasive particles 304 to be used may depend on the degree of roughening desired, on the size of cladding 302 to be roughened, and on the nature of the abrasive particles. For the cladding described hereinabove, the typical amount of abrasive particles is between about 0.1 g and 1.0 g, preferably from about 0.5 to about 1.0 g., and more preferably from about 0.5 to about 0.75 g.

A vibrating device 308 useful in this embodiment can include, for example, a commercially-available orbital sander, an ultrasonic generator, or if magnetic particles are used, a device capable of generating a rapidly-rotating magnetic field, e.g., a C-Frame motor. One example of a useful vibrating device is a commercially available orbital sander, such as a Black and Decker™ Model FS300 offset cam orbital sander (Black and Decker, Towson, Md.), which operates at a speed of approximately 15,000 orbits/minute (opm).

One technique for abrading the inside of an optical waveguide includes placing a small amount of abrasive particles 304 in a length of cladding 302 that has an optional outer jacket 306 around it, as illustrated in FIG. 15. Jacket 306 or cladding 302 may be marked in length increments (centimeters, meters, etc.) to facilitate control of abrasion. Vibrating device 308 is activated and the cladding containing the grit is bent in a "U" shape having a bend radius (for example, a bend radius of approximately 10 cm may be used when a 12 mm i.d. cladding is being abraded) such that abrasive particles 304 are at the bottom of the bend. The bent portion of cladding 302 is placed on the edge of vibrating device 308 and the cladding is moved such that unabraded portions are continually presented at an edge of vibrating device 308. Movement of cladding 302 can be at any rate that will effect the desired amount of abrasion in the tubing. For example, movement of about 3 cm/sec (approximately 0.1 ft/sec) can be used to prepare cladding 302 that results in an optical waveguide exhibiting relatively even light emission along a 1.65 meter (65 inch) length.

Figure 16:
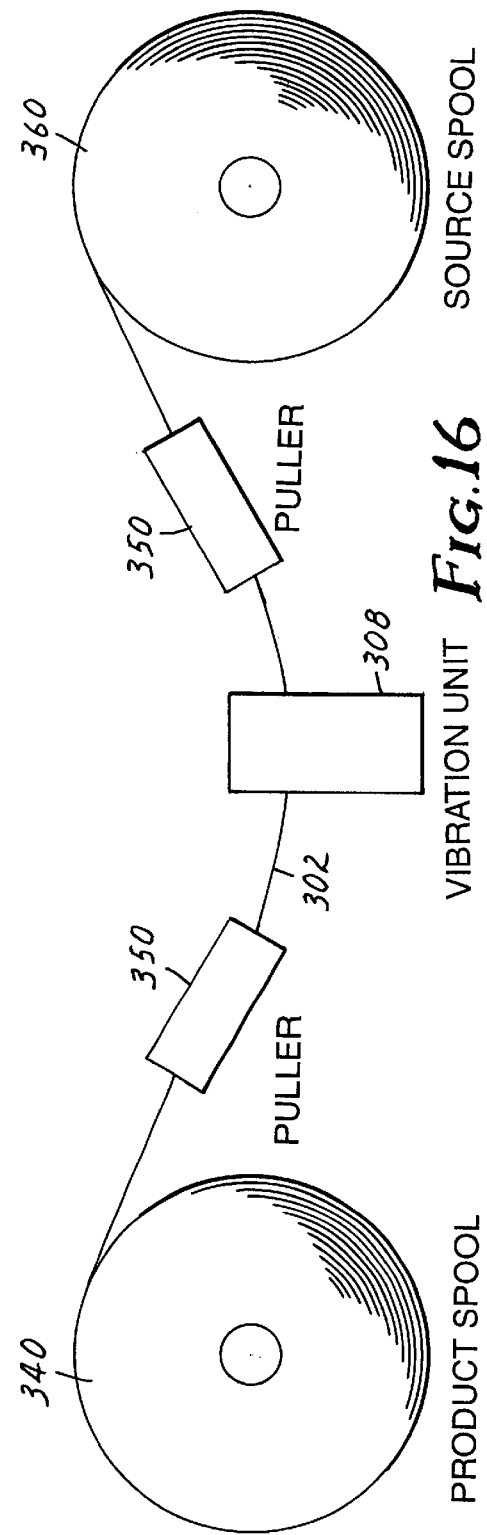
FIG. 16 illustrates a schematic for automation of the roughening process illustrated in FIG. 15.

Alternatively, the process can be automated, one embodiment of which is illustrated in FIG. 16. Cladding 302 is drawn at a controlled rate by pullers 350 from a source spool 360 across a vibrating device 308 and taken up by a product spool 340. In order to affect variation in the degree of roughness achieved, pullers 50 can be automatically controlled to increase or decrease the amount of time that a given portion of cladding 302 is in contact with vibrating device 308.

This method of roughening the inner surface of a cladding may have certain advantages including that it may use equipment that need not be adjusted according to inside diameter of cladding to be abraded and that control over the degree of roughening can be exercised by varying any one or a combination of abrasive particle size, dwell time on the vibrating device, bend radius, pressure of the cladding on the vibrating device, the size of the cladding area in direct contact with the vibrating device, the amount of abrasive particles loading (increased abrasive particles coating typically decreases abrasion), the speed of vibrating device, the abrasive particle composition/hardness, and the abrasive particle shape (smooth, sharp-edged, etc.).

EXAMPLE

Average Surface Roughness Measurements

Roughness measurements were performed using a WYKO RST Roughness/Step Tester (WYKO Corp., Tucson, Ariz.). A square section, about 5 mm on a side, was cut from the sample and placed on the microscope stage of the WYKO instrument. Uniformity of the sample was verified by an initial scan at 10× magnification, and defects or unusual structures were scanned and recorded but were not included in the roughness calculations.

If the sample was relatively smooth, e.g., the surface features were less than approximately 75 nanometers (nm) in depth, according to the initial scan, measurements were taken in "PSI mode," using light of 633 nm wavelength, at 40× magnification. Samples were scanned in two to four areas and $R_a$ (average roughness) and $R_q$ (RMS roughness) values as reported by the WYKO program software were recorded and averaged. If sample features were larger than 75 nm, two to four scans in "VSI mode," at 10× magnification, were taken and $R_a$ and $R_q$ values were reported. A smooth area between deeper surface features was then chosen for scanning at 40×, in the PSI mode.

Measurement and Analysis Procedure for Light Extraction Rate for Light Fibers

The light extraction rate for a light fiber was determined by analyzing sidelight measurements gathered using a Fostec (Fostec Inc., Auburn, N.Y.) or other light source and a Minolta LS-110 luminance meter (Minolta Corp., Instrument Systems, Ramsey, N.J.). The measurement technique required that the interior of the fiber cladding was roughened uniformly with respect to distance down the fiber, in other words the sample was not graded. Under this assumption, when the fiber was illuminated by a single light source at one end, the luminance, U, extracted out of the side of the fiber, normal to the surface of the fiber, at a distance $x_o >> D/\tan \theta$ down the fiber from the illuminated end of the fiber, where $\theta$ is the acceptance angle of the fiber and D is the diameter of the fiber, was approximated to a high degree of accuracy by a simple exponential decay law.

$$U = U_o e^{-\alpha(x-x_o)}$$

where $U_o$ is the luminance extracted at distance $x=x_o$. The exponential decay constant $\alpha$ is called the extraction rate.

To determine the extraction rate for a sample fiber, a short segment was first cut off the end of the sample to ensure a flat, smooth edge for light injection into the fiber. The fiber end was then mounted in a chuck designed to place the end of the fiber at the focal point of the light source, and the fiber end and chuck were inserted in the source. The source was turned on at its maximum value. The reference point $x_o$ was chosen so that $x_o = 20D/\tan \theta$, which was about 30 cm for a 12 mm diameter light fiber. Starting at the reference point, the luminance out of the fiber and normal to the surface of the fiber was measured using the Minolta LS-110 luminance meter at points $x_i$, located at 12.7 cm intervals from the reference point, down the length of the fiber from the reference point. The luminance was measured four times at each point. The fiber was then rotated 180 degrees about its axis, and the luminance was measured four more times at each point $x_i$. The meter was located and focused at a distance from the fiber such that the region over which it averaged had a diameter ⅓ the outer diameter of the fiber, i.e. the focused circle seen through the viewfinder was ⅓ the diameter of the outer diameter of the fiber. Based on the exponential decay model, the extraction rate was estimated using linear regression on the measured data with a log scale for the ordinate. The fit was checked by examining the correlation coefficient and 95.4% confidence interval for the fit parameter, $\alpha$.

Table 1 shows some typical values indicating the degree of accuracy of the fit and controllability of the extraction rate for three techniques of roughening the interior of the cladding.

TABLE 1

| Method | Control Parameter | Volume of Control Parameter | $\alpha(ft^{-1})$ |
|---|---|---|---|
| Sandblast (Example 1) | Pressure | 104 kPa (15 psi) | 0.44 ± 0.47 |
| | | 345 kPa (50 psi) | 1.53 ± 0.076 |
| | | 586 kPa (85 psi) | 3.26 ± 0.11 |
| Brush (Example 3) | Pull Rate | 12.7 cm (5 in)/sec | 0.18 ± 0.067 |
| | | 19.0 cm (7.5 in)/sec | 0.20 ± 0.068 |
| | | 96.5 cm (38 in)/sec | 0.097 ± 0.005 |
| | | 152.4 cm (60 in)/sec | 0.081 ± 0.006 |
| Vibration (Example 4) | Pull Rate | 1.83 m (6 ft)/min | 0.56 ± 0.015 |
| | | 3.66 m (12 ft)/min | 0.39 ± 0.014 |
| | | 6.1 m (20 ft)/min | 0.23 ± 0.004 |

In Table 1, the parameter $\alpha$ is the proportion of light emitted relative to the amount of light remaining in the fiber at any point away from the source. A larger value of $\alpha$ indicates greater light emission.

The data of Table 1 show that the degree of roughness imparted to the cladding interior may determine the amount of light extracted. In the sandblasting method, Example 1, increased air pressure in the sandblaster caused increased roughness and increased light extraction. In the rotating brush method, Example 3, a more rapid pull rate translated into decreased abrasion and decreased light extraction. In the vibration method, Example 4, increased pull rate translated into decreased abrasion and decreased light extraction.

Example 1

Roughened Cladding Via Sandblasting As Illustrated in FIG. 12

A fluorinated ethylene propylene polymer was extruded and expanded to form a fluoropolymer tubing such as is available from, e.g., Zeus Industrial Products, Inc. (Raritan, N.J.). The tubing was approximately 5 meters long and had a 12 mm inner diameter. The tubing had an outer jacket of polyethylene with an inner diameter of approximately 13.5 mm. The tubing was threaded onto the vacuum collection portion of a sandblasting device, as described above and shown in FIG. 12. Two puller wheels engaged the outer jacket to move the tubing at a rate of approximately 45 cm/min.

A stainless steel tube, approximately 3 meters long and 11 mm outer diameter (OD), was connected to a PowerFlo 2000™ sandblaster (Comco Inc., Burbank, Calif.). The stainless steel tube terminated with a shot nozzle which was inserted into the open end of the tubing and then fixed in place approximately 6 mm from the end of the deflector head. The deflector head formed a 90° cone and was connected to an 11 mm (0.44 in) OD stainless steel tube which was, in turn, connected to a vacuum pump in order to collect debris. The nozzle and deflector head were sealed to the inner wall of the tubing by Teflon™-impregnated butyl rubber O-rings held in place by stiff Teflon™ washers on either side of the O-ring.

Abrasion of the inside of the tubing was accomplished by blasting with BT-13™ spherical glass beads (Comco Inc.) having a diameter of 50 to 100 μm at pressures ranging from 69 to 586 kPa (10 to 85 psi) above atmospheric pressure. The tubing was moved over the shot nozzle at 45 cm/min to produce a uniformly abraded tube.

Example 2

Roughened Cladding Via Sandblasting As Illustrated in FIGS. 13A and 13B

A fluorinated ethylene propylene polymer was extruded and expanded to form a fluoropolymer tubing such as is available from, e.g., Zeus Industrial Products, Inc. (Raritan, N.J.). The tubing was approximately 0.76 meters (30 in.) long and had a 12 mm interior diameter. The tubing had an outer jacket of polyethylene with an inner diameter of approximately 13.5 mm.

A sandblaster was provided with a hand-held nozzle (Model 190, Binks Manufacturing Co., Franklin Park, Ill.) which tapered from a 38 mm to 12 mm outer diameter at the tip where the abrasive particles were expelled through a 9.5 mm diameter orifice. A pressure regulator was provided to allow operation at pressures ranging from about 70 to about 630 kPa (10 to 90 psi). Because of its outer diameter, the nozzle could not be inserted into the tubing. The abrasive particles were 100 to 200 μm diameter glass beads.

A second piece of tubing was slit longitudinally with a razor blade and then manually compressed to a maximum outer diameter of about 6 mm. This second piece of tubing was inserted into the first tubing so that only about 100 mm of the inner surface of the first tubing was exposed. The inner surface of the first tubing was blasted for 30 seconds at about 200 kPa (30 psi) with the nozzle of the sandblaster being held at the exposed end of the first tubing.

The second tubing was then pulled back by about 150 mm. The exposed region (now 250 mm) was abraded for 30 seconds at about 175 kPa (25 psi). The steps were repeated with exposure regions of 450 mm with abrasion for 30 seconds at about 140 kPa (20 psi) and 760 mm with abrasion for 30 seconds at about 100 kPa (15 psi). The second tubing was removed prior to the last abrasion step. The debris was removed from the interior of the tubing using pressurized air.

A core, prepared as described in Example 5 was coated with a viscous fluid, a siloxane copolymer (PS 785, Petrarch Silanes, United Chemical Technologies, Inc., Bristol, Pa.), having an index of refraction (1.465 at 583 nm) nearly identical to the core. Insertion of the core required vigorous pushing. The core was then allowed to sit for 30 minutes to rebound to its original shape.

The fluoropolymer tubing was then heat shrunk around the core using a heat gun with a maximum temperature rating of 1000° F. (about 540° C.) to provide an intimate contact between the cladding and the core. The heat shrinking process is commenced close to the center of the tubing sample so that air bubbles are expelled from the end of the tubing as the heat is applied towards the ends.

Example 3

Roughened Cladding Via Brush Abrasion As Illustrated in FIG. 14

A laboratory test tube brush having a 7.62 cm head of nylon bristles of approximately 1.27 cm outside diameter (OD), available from, e.g., Fisher Scientific, Pittsburgh, Pa., Catalog No. 03-635, was modified by shortening the twisted-wire handle to allow it to fit into a hole drilled in the end of an 0.6 cm OD aluminum rod and rigidly attached therein by means of six evenly spaced set screws. The aluminum rod was mounted in the chuck of an electric drill, Black and Decker ⅜" Variable Speed drill Model 7190 (Black and Decker US Inc., Towson, Md.).

A fluoropolymer (FEP, Fluorinated Ethylene-Propylene Copolymer, also available as Teflon-100™) tubing having an interior diameter of approximately 12 mm, available from, e.g., Zeus Industrial Products, Inc., Raritan, N.J., and approximately 1 meter long, was held by hand as the rapidly rotating brush (approximately 1200 rpm) was inserted and removed at rates of approximately 12.7, 19.0, 96.5, and 152.4 cm/sec in order to score or abrade the tubing interior to a length of approximately 30 cm. The tubing was flushed with water to remove abrasion debris.

Example 4

Roughened Cladding Via Vibration As Illustrated in FIGS. 15

A sample of polyethylene-clad 12 mm inner diameter FEP Teflon™ tubing (see Example 3) with a length of 1.65 m was marked off in 30.5 cm (1 ft) sections. A total of 0.5 g of 80 to 120 mesh silicon carbide grit particles was poured into the tube, and the tube was bent in a "U" shape with a local radius of approximately 10 cm. The bent portion was placed against the side of the vibrating bed of a Black and Decker™ Model FS300 orbital sander and the sander was turned on. The position of the bend of the tubing was moved continuously by hand, at a rate of 10 seconds per 30.5 cm (0.1 ft/sec) to produce a tube having relatively uniform abrasion.

Figure 17:
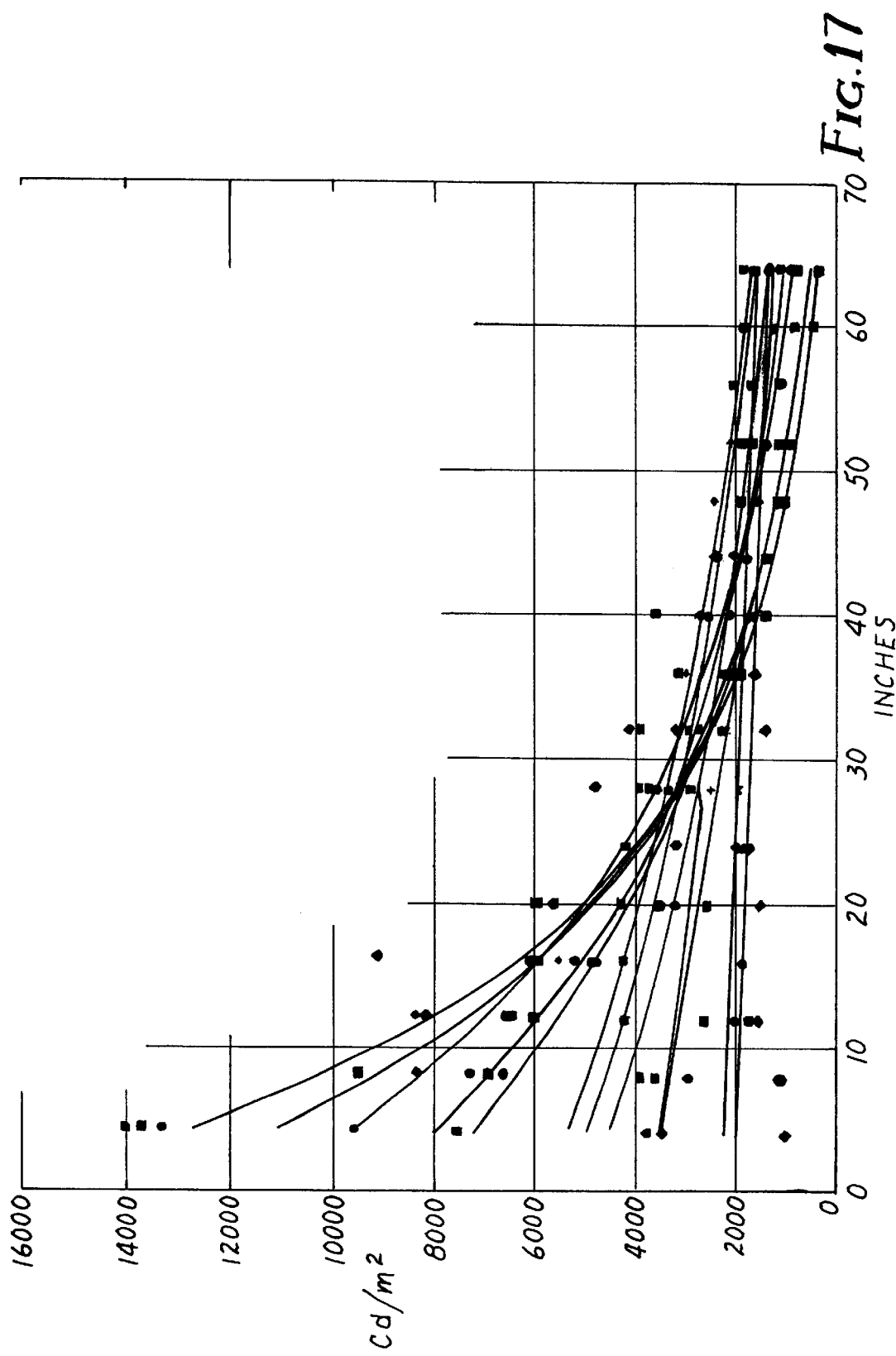
FIG. 17 is a graph of extracted light intensity versus position for several optical waveguides made using the apparatus and method illustrated in FIG. 15.

This procedure was repeated at abrasion rates of 10 to 60 seconds/30.5 cm. Light extrusion from light fibers made with the cladding are shown in FIG. 17, in which light extraction (measured as intensity in candela/m$^2$) is plotted as a function of distance from the source, for abrasion times of 10 seconds (10A, 10B), 20 seconds (20A, 20B), 30 seconds (30A, 30B), 40 seconds (40A, 40B), 50 second (50A, 50B), and 60 seconds (60A, 60B) of abrasion per 30.6 cm. Two lengths of tubing were prepared at each abrasion rate, and data are shown for both.

The data of FIG. 17 show that a brief abrasion time (10 seconds per 30.6 cm) abrades the cladding the least, and the least amount of light is extracted from the optical waveguide. Further, the least amount of abrasion provides the most uniform light extraction over the length of the light fiber.

Example 5

Optical Waveguide made with the Roughened Cladding of Example 1

An optical waveguide was prepared according to the procedure described in U.S. Pat. No. 5,225,166, incorporated herein by reference, using the tubing abraded by sandblasting, as described in Example 1. To form the optical waveguide, the tubing was filled with a thermally-polymerizable mixture comprising a 1:1 mixture by weight of n-butyl methacrylate and 2-ethylhexyl methacrylate, which, in turn, contained 0.05% by weight triethylene glycol dimethacrylate crosslinking agent and 0.2% by weight di(4-t-butylcyclohexyl)peroxydicarbonate (Perkadox 16™, Akzo Nobel Chemicals, Inc., Chicago, Ill.) thermal initiator. A slight vacuum was used to assist in filling the tube. One end of the tube was then sealed and the filled tube was placed in a reactor, as described in U.S. Pat. No. 5,298,327, incorporated herein by reference, and U.S. Pat. No. 5,225,166. The reactor was sealed, pressurized to approximately 250 psi (1.7 MPa) with nitrogen gas, then chilled to about 2° C. Water heated to about 60° C. was introduced into the bottom of the reactor and was caused to rise at a rate of approximately 0.9 m/hr. When the heated water had reached the top of the reactor, the temperature was held for two hours, after which the reactor was emptied and the polymer-filled tube was cooled and removed from the reactor.

Extraction of light from the resultant optical waveguide was significantly greater than that from an optical waveguide whose cladding was essentially free of roughness. Extraction rates for samples sandblasted at 104, 345, and 586 kPa are shown in Table 1. For comparison, the extraction rate for untreated, unroughened fiber is approximately 0.01 ft$^{-1}$.

Example 6

Optical Waveguide made with the Roughened Cladding of Example 3

An optical waveguide was prepared according to the procedure described in Example 5, using the tubing abraded by brush obtained as described in Example 3.

Extraction of light from the resultant light fiber was significantly greater than that from a light fiber whose cladding was essentially free of roughness. Extraction rates for samples prepared using a pull rate of 12.7, 19.0, 96.5, and 152.4 cm/sec are shown in Table 1. For comparison, the extraction rate for untreated, unroughened fiber is approximately 0.01 ft$^{-1}$.

Example 7

Optical Waveguide made with the Roughened Cladding of Example 4

Each of the vibration-abraded samples from Example 4 was used as the cladding for an optical waveguide, as described in Example 5. Light extraction measurements for each tube were made at 25 cm intervals. Results are shown in FIG. 17.

As noted above, the present invention is applicable to the fabrication of a number of different devices where an isolation region is formed in a substrate. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical waveguide comprising:

a flexible core of light transmitting material having an axis in the general direction of light flow through the optical waveguide; and a flexible cladding surrounding the core to provide a flexible optical waveguide, the cladding having an index of refraction that is less than an index of refraction of the core, the cladding comprising an inner surface which is roughened with indentations to extract light from the core, the indentations being substantially non-parallel with respect to the axis of the core and providing a plurality of roughened regions along a length of the cladding, with at least two of the regions having different degrees of roughness provided by the indentations, to produce a light extraction pattern from the waveguide, wherein the core further comprises two or more light receiving ends and the roughening of the inner surface of the cladding increases with increasing distance from a nearest one of the light receiving ends, as measured along the core.

2. An optical waveguide comprising:

a flexible core of light transmitting material having an axis in the general direction of light flow through the optical waveguide;

a flexible cladding surrounding the core to provide a flexible optical waveguide, the cladding having an index of refraction that is less than an index of refraction of the core, the cladding comprising an inner surface which is roughened with indentations to extract light from the core, the indentations being substantially non-parallel with respect to the axis of the core and providing a plurality of roughened regions along a length of the cladding, with at least two of the regions having different degrees of roughness provided by the indentations, to produce a light extraction pattern from the waveguide; and a reflective cladding surrounding at least a portion of the optical waveguide for reflecting light extracted from the core toward a preferred set of directions.

3. The optical waveguide of claim 2, wherein the core further comprises a light receiving end and the roughening of the inner surface of the cladding increases with increasing distance from the light receiving end, as measured along the core.

4. The optical waveguide of claim 3, wherein the roughening of the inner surface of the cladding is increased at discrete intervals.

5. The optical waveguide of claim 2, wherein the inner surface includes one or more substantially smooth regions separating two or more roughened regions.

6. The optical waveguide of claim 2, wherein the inner surface is roughened so that, when a light source is coupled to a light receiving end of the core, the intensity of light extracted from the core is substantially uniform along the length of the roughened inner surface.

7. The optical waveguide of claim 2, wherein the reflective cladding comprises a diffusive reflecting surface.

8. The optical waveguide of claim 2, wherein the core has an outer surface complementary to the inner surface of the cladding.

9. The optical waveguide of claim 2, wherein the indentations comprise a plurality of randomly-spaced pits.

10. The optical waveguide of claim 2, wherein the core comprises a flowable material.

11. The optical waveguide of claim 2, wherein a portion of the cladding that is roughened extends at least 30 centimeters.

12. The optical waveguide of claim 2, wherein a portion of the cladding that is roughened extends at least 1 meter.

13. An optical waveguide comprising:
   a flexible core of light transmitting material having an axis in the general direction of light flow through the optical waveguide;
   a flexible cladding surrounding the core to provide a flexible optical waveguide, the cladding having an index of refraction that is less than an index of refraction of the core, the cladding comprising an inner surface which is roughened with indentations to extract light from the core, the indentations being substantially non-parallel with respect to the axis of the core and providing a plurality of roughened regions along a length of the cladding, with at least two of the regions having different degrees of roughness provided by the indentations, to produce a light extraction pattern from the waveguide; and
   a liquid layer between at least a portion of the cladding and the core, the liquid layer having an index of refraction approximately equal to the index of refraction of the core.

14. An optical waveguide comprising:
   a flexible core of light transmitting material having an axis in the general direction of light flow through the optical waveguide; and
   a flexible cladding surrounding the core to provide a flexible optical waveguide, the cladding having an index of refraction that is less than an index of refraction of the core, the cladding comprising an inner surface which is roughened with indentations to extract light from the core, the indentations being substantially non-parallel with respect to the axis of the core and providing a plurality of roughened regions along a length of the cladding, with at least two of the regions having different degrees of roughness provided by the indentations, to produce a light extraction pattern from the waveguide, wherein the indentations comprise a set of one or more spiraling indentations, the spiraling indentations being formed at an angle greater than about 30° to the central axis of the core.

15. A method of making a flexible optical waveguide with diffuse light extraction, comprising:
   providing a flexible cladding formed with an axis in the general direction of light flow through the flexible optical waveguide, the cladding comprising a hollow tube with a first end and an inner surface;
   roughening at least a portion of the inner surface of the cladding by forming indentations in the inner surface, the indentations being substantially non-parallel with respect to the axis of the cladding, to produce a plurality of roughened regions along a length of the cladding with at least two of the regions having different degrees of roughness provided by the indentations to produce a light extraction pattern;
   disposing a flexible core material within the cladding; and
   disposing a liquid between the core and the cladding, the liquid having an index of refraction substantially similar to an index of refraction of the core.

16. The method of claim 15, wherein roughening at least a portion of the inner surface of the cladding comprises impacting at least a portion of the inner surface with particles ejected from a delivery unit to form a plurality of randomly-spaced pits in the inner surface of the cladding.

17. The method of claim 16, wherein impacting the inner surface comprises sandblasting the inner surface of the cladding.

18. The method of claim 16, wherein the roughening of the inner surface is varied by varying a velocity at which the particles are ejected.

19. A method of making a flexible optical waveguide with diffuse light extraction, comprising:
   providing a flexible cladding formed with an axis in the general direction of light flow through the flexible optical waveguide, the cladding comprising a hollow tube with a first end and an inner surface;
   roughening at least a portion of the inner surface of the cladding by forming indentations in the inner surface, the indentations being substantially non-parallel with respect to the axis of the cladding, to produce a plurality of roughened regions along a length of the cladding with at least two of the regions having different degrees of roughness provided by the indentations to produce a light extraction pattern, wherein said roughening comprises rotating a member with one or more projections extending from the member, the projections being in contact with the inner surface of the cladding and producing indentations on the inner surface of the cladding as the member rotates, the member also moving laterally down the cladding as the member rotates, wherein the projections form spiral indentations in the inner surface of the cladding, the spiraling indentations being formed at an angle greater than about 30° to the axis; and
   disposing a flexible core material within the cladding.

20. The method of claim 19, wherein the roughening of the inner surface of the cladding increases with increasing distance from a light receiving end of the optical waveguide, as measured along the core.

21. The method of claim 19, wherein, after the core material is disposed within the cladding, the core material flows around the inner surface of the cladding to generate an outer surface of the core material which is complementary to and in contact with the inner surface of the cladding.

22. A method of making a flexible optical waveguide with diffuse light extraction, comprising:
   a) providing a flexible cladding formed with an axis in the general direction of light flow through the flexible optical waveguide, the cladding comprising a hollow tube with a first end and an inner surface;

b) roughening at least a portion of the inner surface of the cladding by forming indentations in the inner surface, the indentations being substantially non-parallel with respect to the axis of the cladding, to produce a plurality of roughened regions along a length of the cladding with at least two of the regions having different degrees of roughness provided by the indentations to produce a light extraction pattern, wherein said roughening comprises i) introducing an amount of abrasive particles into the cladding;

ii) contacting an outer surface of the cladding with a vibrating device; and (iii) vibrating the cladding so that the abrasive particles roughen the inner surface of the cladding; and c) disposing a flexible core material within the cladding.

23. An optical waveguide made according to the process of claim 22.

UNITED STATES PATENT AND TRADEMARK OFFICE
CERTIFICATE OF CORRECTION

PATENT NO. : 6,301,418 B1
DATED : October 9, 2001
INVENTOR(S) : Freier et al.

Page 1 of 1

It is certified that error appears in the above-identified patent and that said Letters Patent is hereby corrected as shown below:

<u>Column 14,</u>
Line 66, please delete "of a" and insert therefore -- of $\alpha$ --.

Signed and Sealed this

Ninth Day of April, 2002

*Attest:*

*Attesting Officer*

JAMES E. ROGAN
*Director of the United States Patent and Trademark Office*